June 21, 1938.  W. VON WEDELSTAEDT  2,121,720
CONTROL FOR THE MOVEMENT OF VEHICLE BODIES
Filed Oct. 22, 1937
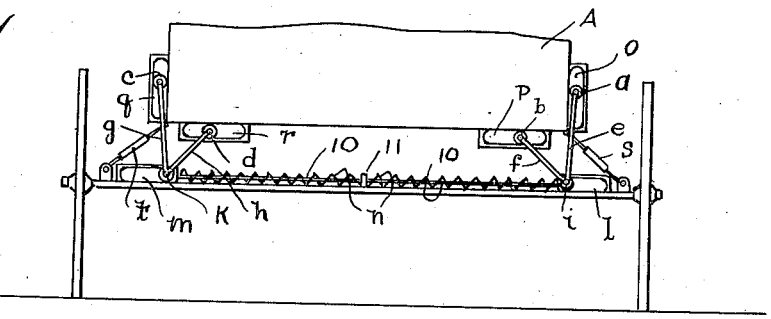
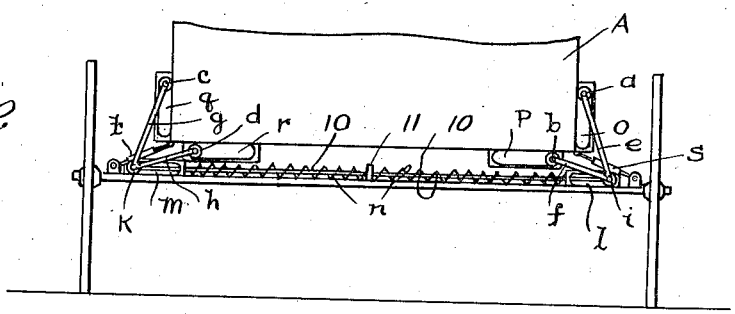
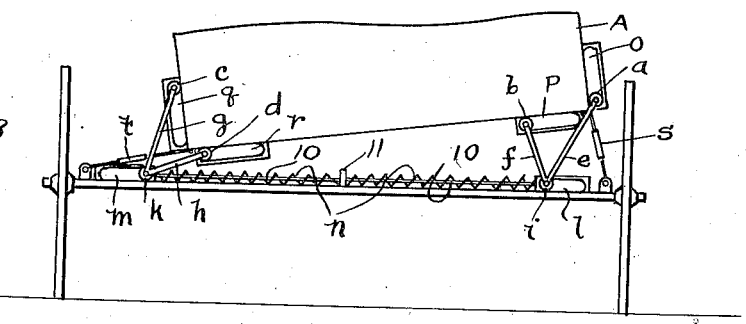
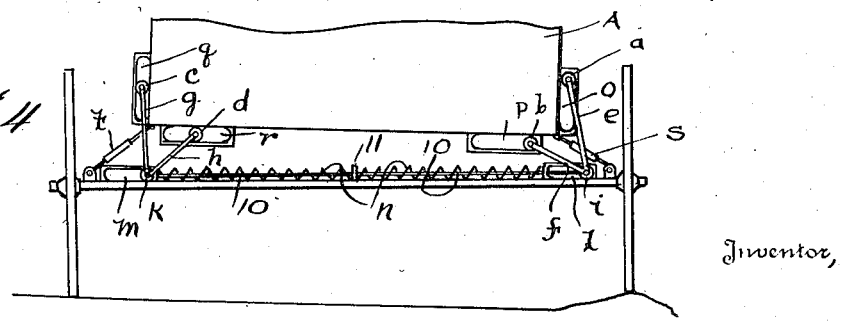
Inventor,
Wolff von Wedelstaedt,
By Frank S. Appleman
Attorney Patented June 21, 1938

2,121,720

UNITED STATES PATENT OFFICE 2,121,720

CONTROL FOR THE MOVEMENT OF VEHICLE BODIES

Wolff von Wedelstaedt, Leipzig, Germany

Application October 22, 1937, Serial No. 170,457
In Germany August 29, 1936

5 Claims. (Cl. 280—112)

My invention relates to means for banking the body of a vehicle as it rounds a curve. Springs for the purpose of banking or slanting the body of vehicles when taking curves are known in the art and consist for the most part of pivoted means supporting the body. These devices, however, have the great disadvantage that they only function, to any great extent, when the body and the vehicle are in the normal position. When turning curves and the body is slanted, as well as when the vehicle is thrown out of the vertical by bumps or other elevations in the road, etc., the spring action in the usual installations is unequal on each side of the body, and frequently the length of the spring proves to be too short to remain in contact on one side, so that the body is subjected to strong rattling and shaking, that is to say, it cannot assume a properly banked position conforming to the bend of the curve and the speed of the vehicle.

An object of the invention is to correct this shortcoming and cause a perfect spring action which has sufficient force to create and maintain a continuous spring effect between the body banked on a curve and the chassis of the vehicle.

A further object is to provide a new spring action and a novel manner of vertically actuating the joints of pivot members mounted on the chassis by means of a spring in such manner that said spring takes up all of the swinging motions of the body through the corresponding vertical shifting of both joints or one joint, as the case may be. In the preferred form, these joints form the vertex of bell cranks which move with the movement of the body or chassis by means of roller provided arms, one of which slidingly rests on the bottom of the body and another arm which rests slidingly on the side wall of said body.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a schematic rear view of a vehicle including my invention and showing the vehicle in a position of rest or in a straight course with a normal load and stress;

Figure 2 illustrates a similar view with the vehicle bearing an increased load and stress;

Figure 3 illustrates a view similar to Fig. 1 but showing the vehicle body banked for a left hand curve; and Figure 4 illustrates a view similar to Fig. 1 but showing the position assumed by the body with the right rear wheel on a bump or the like.

As shown in the drawing the body A is supported at the rear on either side by end rollers $a$, $b$ and $c$, $d$ pivotally secured to the free ends of arms $e$, $f$ and $g$, $h$, respectively of bell cranks. The vertices of these bell cranks are also pivotally secured to rollers or sliding means $i$, $k$, respectively, which are movable transversely of the vehicle on horizontal tracks or guideways $l$, $m$ against the action of the spring $n$, which tends to draw them towards the center of the vehicle. The springs $n$ comprise coil springs extending transversely of the vehicle and may be mounted on a rod or other support 10 extending axially thereof. The ends of the rod 10 are pivotally attached to the apices $k$, $i$ of the bell cranks. The outer ends of the springs $n$ bear against the inner ends of the guides $m$, $l$. The inner ends of the springs $n$ bear against the collar 11 secured on said rod. The rollers $a$, $c$ operate in vertical guides or tracks $o$, $q$, respectively, and the rollers $b$, $d$ operate respectively in the horizontal guides or tracks $p$, $r$. In addition, the movements of the vehicle body are counteracted by shock absorbers $s$, $t$ which are mounted on the vehicle frame and are attached respectively to the right and left side of the vehicle body A.

As the arrangement of cranks, rollers, guides, spring and shock absorbers is the same at the front end of the vehicle as the just described arrangement at the rear, further description is superfluous. With particular reference to Figs. 1-3 inclusive, the operation of the device will now be described, it being understood that the action of the arrangement at the rear is duplicated at the front unless otherwise specified.

As shown in Figs. 1 and 2, the vertices $i$, $k$ of the bell cranks shift from the inner to the outer ends of the tracks $l$, $m$ against the action of the horizontal spring $n$ and the shock absorbers $s$, $t$ when the body carries a maximum load in the position of rest or on a straight drive. In this position, the end rollers $b$, $d$ and $a$, $c$ of the bell crank arms are seated, respectively, in the outer the upper terminals of the guides $p$, $r$ and $o$, $q$. From this position, the body can not move further downward, which proves that the maximum loading which is responsible for this extreme position should be avoided. In all lesser loads, however, the vertical springing movement of the body is assured by means of the spring $n$ and the shock absorbers $s$, $t$.

With the vehicle carrying less than a maximum load and taking a left curve, the body A, as shown in Fig. 3, is slid to the right against the action of the springs $n$ by reason of the centrifugal force which is initiated by the turning of the vehicle. Fig. 3 shows the position which the body assumes at the end of the right hand limit of slide. Obviously, this position does not arise on slight curves or during low speeds, the amount of slide permitted by the springs $n$ and shock absorbers $s$, $t$ depends almost entirely upon the sharpness of the curve and/or the speed of the vehicle. Other factors, such as the load and the degree of bank of the road enter into the situation to some extent also.

By comparing Figs. 1 and 3, it is easy to see that when the vehicle enters the curve, (a left hand curve, for example), the body slides towards the right and the left hand ends of the guides $r$, $p$, engage the rollers $d$, $b$ respectively, and cause the bell cranks to pivot on their vertices in a clockwise direction. This action raises the arm $f$ of the right hand bell crank and as the roller $b$ thereof can slide no farther in the track or guide $p$, the right side of the vehicle body is, perforce raised. In like manner, the roller $d$ of the arm $h$ of the left hand bell crank has also reached its limit in the guide $r$ and carries the left hand side of the vehicle down as the right side is raised.

When a right hand curve is taken, the reverse of the above operation takes place and the left hand side of the body is raised while the right is lowered. In this connection, it is to be noted that the lowering of the one side of the body is the result of a positive forcing down of that side while the opposite side is positively raised. Consequently, the body A pivots laterally about its longitudinal axis, although there actually is no central support therefor. By this action, each side of the body A is raised or lowered only one-half as much as would be necessary were the pivots arranged at the corners of the vehicles.

Moreover, the sliding action not only eliminates the necessity for central and longitudinal axial pivots for the body A but creates the force for actuating the bell cranks. Further, this arrangement provides means whereby the correct degree of banking of the body A is automatically achieved without a complicated and expensive arrangement.

During the return from the curve to the straight run, the body A, by reason of the force of gravity and assisted by the neutralizing effect of the shock absorbers, gradually returns to its normal position in accordance with the diminishing centrifugal force.

When the right rear wheel hits a bump or such, (Fig. 4), the right wheel and right end of the axle are raised and the vertex and roller $i$ of the bell crank $e$, $f$ are slid to the right against the pressure of spring $n$, and arrive eventually at the terminal point shown in Fig. 4. The end rollers $a$, $b$ arrive, respectively, at the upper and right terminals of guides $o$ and $p$, while bell crank $g$, $h$ remains in the neutral position. Thus, no sliding of the body A occurs and its horizontal position is, therefore, not disturbed.

While I have shown and described what is now believed to be the preferred form of the invention, yet it is obvious that it is capable of other expressions and embodiments. Consequently, the attached drawing and foregoing description are to be regarded as being illustrative rather than limitative, it being my intention not to limit myself to the precise structure shown and described except as hereinafter claimed.

I claim:

1. In a vehicle including running gear and a body, means connecting said body to said running gear and comprising the sole support for said body, said means being operable when said vehicle rounds a curve to automatically bank said vehicle to said curve to an angle commensurate with the speed of the vehicle and degree of the curve, said means including a slidable connection between said running gear and said body to permit a limited and variable lateral sliding of said body under the influence of the centrifugal force generated by the rounding of the curve, said connection including rigid means slidably and pivotally carried by said running gear and slidably and pivotally connected to said body, certain of said connecting means being actuated by said sliding of said body to raise the side thereof adjacent the long arc of the curve, and the remaining connecting means being similarly actuated to simultaneously lower the other side of said body.

2. A device for automatically banking a vehicle body for rounding a curve to an angle commensurate with the speed of the vehicle and degree of the curve, said device comprising the sole support for said body on the running gear of said vehicle, comprising rigid arms slidably and pivotally connected to the running gear of said vehicle for sliding and swinging movement in directions transverse to the direction of travel of said vehicle, the free ends of said arms being slidably and pivotally connected to the sides of said vehicle to permit a lateral sliding of said body under the influence of centrifugal force generated by the rounding of a curve, spring means resisting said sliding, means limiting the sliding of said body, said means being associated with the free ends of said arms and causing the arms connected to one side of said body to raise that side while simultaneously causing the arms connected to the other side of said body to lower the same.

3. In a vehicle including running gear and a body, a spring suspension means connecting said body to said running gear, said means including at least a pair of inwardly facing bell cranks horizontally slidable and pivotally connected at the vertices to said running gear, spring means connecting said vertices and resisting sliding movement of said cranks away from each other, the free ends of the inwardly directed arms of said cranks being pivotally connected and horizontally slidable with respect to the bottom of said body, the free ends of the other arms of said cranks being pivotally connected and vertically slidable with respect to the sides of said body, means limiting the sliding movement of the arm ends and vertices of said cranks whereby to permit limited lateral sliding of said body under the influence of centrifugal force generated therein during the rounding of said curve, said means limiting the sliding of the free ends of said inwardly directed arms causing them to pivot on their vertices and raise that side of the body nearest the long arc of said curve while simultaneously lowering the opposite side of said body.

4. In a vehicle including running gear and a body, a spring suspension means connecting said body to said running gear, said means including at least a pair of inwardly facing bell cranks horizontally slidable and pivotally connected at the vertices to said running gear, spring means connecting said vertices and resisting sliding movement of said cranks away from each other, the free ends of the inwardly directed arms of said cranks being pivotally connected and horizontally slidable with respect to the bottom of said body, the free ends of the other arms of said cranks being pivotally connected and vertically slidable with respect to the sides of said body, means limiting the sliding movement of the arm ends and vertices of said cranks whereby to permit limited lateral sliding of said body under the influence of centrifugal force generated therein during the rounding of said curve, said means limiting the sliding of the free ends of said inwardly directed arms causing them to pivot on their vertices and raise that side of the body nearest the long arc of said curve while simultaneously lowering the opposite side of said body, the vertex of either of said cranks being slidable outwardly to permit the passage of the nearest ground engaging member over an obstruction to raise one end of said running gear without altering the level of said body.

5. In a vehicle including running gear and a body, a spring suspension means connecting said body to said running gear, said means including at least a pair of inwardly facing bell cranks horizontally slidable and pivotally connected at the vertices to said running gear, spring means connecting said vertices and resisting sliding movement of said cranks away from each other, the free ends of the inwardly directed arms of said cranks being pivotally connected and horizontally slidable with respect to the bottom of said body, the free ends of the other arms of said cranks being pivotally connected and vertically slidable with respect to the sides of said body, means limiting the sliding movement of the arm ends and vertices of said cranks whereby to permit limited lateral sliding of said body under the influence of centrifugal force generated therein during the rounding of said curve, said means limiting the sliding of the free ends of said inwardly directed arms causing them to pivot on their vertices and raise that side of the body nearest the long arc of said curve while simultaneously lowering the opposite side of said body, and springs connecting the sides of said body to said running gear, said springs being operative to resist the sliding and banking of said body.

WOLFF von WEDELSTAEDT.